Jan. 15, 1957
R. MULLINS
2,777,241
MINNOW BUCKET
Filed Dec. 9, 1953
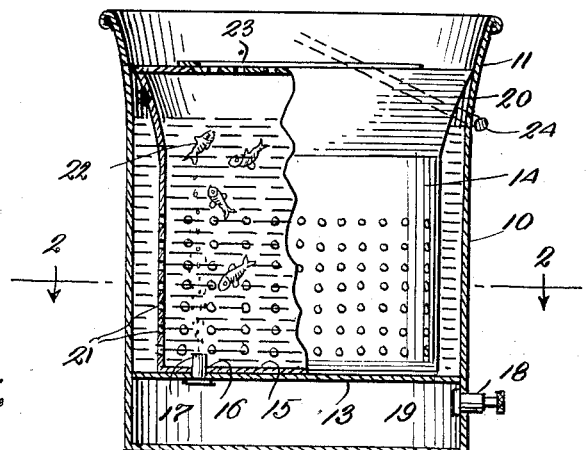
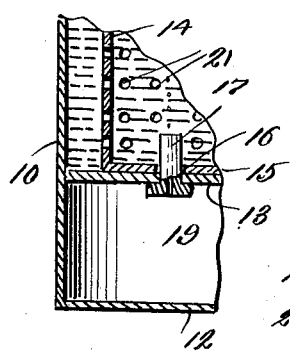
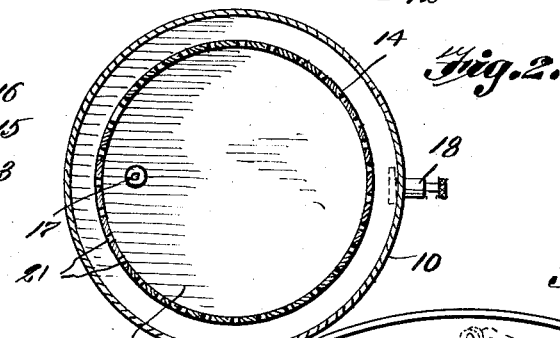
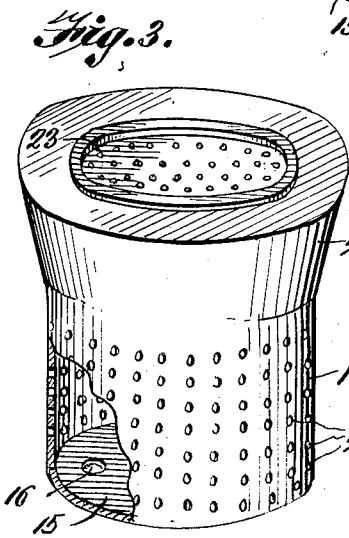
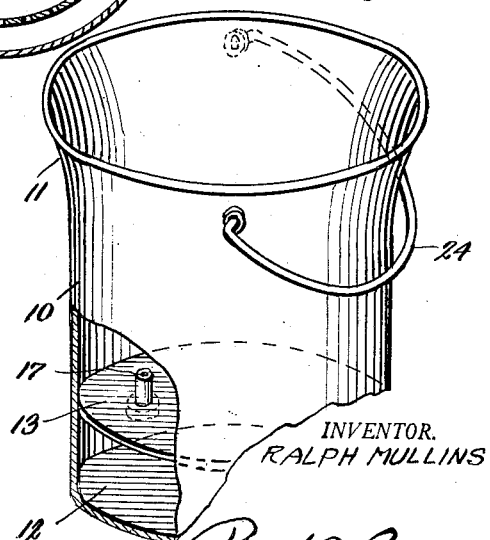
INVENTOR.
RALPH MULLINS
Patrick D. Beavers
ATTORNEY

United States Patent Office

2,777,241
Patented Jan. 15, 1957

2,777,241

MINNOW BUCKET

Ralph Mullins, Keen Mountain, Va.

Application December 9, 1953, Serial No. 397,073

1 Claim. (Cl. 43—56)

The present invention relates to improvements in fishermen's appliances and more particularly to an improved minnow bucket.

The principal object of the present invention is to provide a minnow bucket in which the water content is aerated in order to keep the minnows fresh and lively.

Another important object of the invention is to provide an aerated minnow bucket which is of simple construction and of low cost to manufacture.

Still another object of the invention is to provide an aerated minnow bucket in which a supply of compressed air will serve to maintain a considerable number of minnows supplied with oxygen over a considerable period of time.

These and various other objects and advantages of the invention will become apparent to the reader of the following description.

In the drawing:

Figure 1 is a vertical sectional view through the minnow bucket.

Figure 2 is a horizontal sectional view taken on line 2—2 of Figure 1.

Figure 3 is a perspective view of the inner receptacle with a portion broken away.

Figure 4 is a perspective view of the outer receptacle with a portion broken away.

Figure 5 is a fragmentary vertical sectional view showing the receptacle nested.

Referring to the drawing, wherein like numerals designate like parts, it can be seen that numeral 10 denotes an outer receptacle, preferably having its upper portion flared as at 11. Numeral 12 denotes the bottom of the outer receptacle 10 and a few inches above this bottom 12 is located a false bottom 13 upon which the bottom of an inner receptacle 14 can rest, when this inner receptacle 14 is disposed within the outer receptacle 10, as shown in Figure 1. The inner receptacle 14 has a bottom 15 and this bottom has an opening 16 therein for receiving the upper portion of a valve 17 which is mounted in the false bottom 13 and projects upwardly as shown in Figure 1. An air intake valve 18 in the lower portion of the outer receptacle 10 and a pump can be attached to this valve 18 for supplying compressed air to the compartment 19 and the lower portion of the receptacle 10, the bottom 12 and the false bottom 13.

The upper portion of the inner receptacle 14 has a sharper flare 20 than the flare 11 of the outer receptacle 10, there will be a snug fit of the upper edge of the inner receptacle 14 against the inside of the flare 11 of the outer receptacle 10 to prevent splashing of water from the receptacle, while the receptacle 14 rests upon the false bottom 13.

It will be observed, that the inner receptacle 14 has a multiplicity of openings 21 so that water from the receptacle 10 enters and substantially fills the inner receptacle 14 and this inner receptacle 14, as shown in Figure 1 contains the bait minnows 22.

The top of the inner receptacle 14 which is below the upper edge of the outer receptacle 10 has an opening which is normally covered by a closure plate 23 having perforations therein.

A handle or bail 24 is provided for the outer receptacle 10 whereby the bucket ensemble can be carried.

It can now be seen, that in order to assemble the structure, the inner receptacle 14 is considered displaced from the receptacle 10. Water is then placed in the receptacle 10, after which the inner receptacle 14 is inserted in the position as shown in Figure 1 and the bait minnows 22 placed in the receptacle 14. The closure plate 23 is now disposed in position and any surplus water poured off.

A pump is then attached to the valve 18 and air pumped into the chamber 19. Compressed air will then exist in the chamber 19 and under a moderate poundage will serve to supply oxygen to the minnows through the valve 17 over a considerable number of hours.

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

A bait bucket comprising an outer receptacle having a bottom and side wall, a false bottom above and spaced from the first bottom and a valve in the side wall whereby air may be supplied to the space between said bottoms, a removable inner receptacle having a bottom, side walls and an outwardly flared portion, the flared portions of the outer and inner receptacle being concentric and so shaped as to position a major portion of the wall of the inner receptacle in spaced relation to the wall of the outer receptacle and provide a snug fit at their plane of contact, said portion of the outer receptacle above the false bottom defining a water containing chamber, the wall of the inner receptacle being perforated to allow passage of water from the outer to the inner receptacle, a removable perforated cover for the inner receptacle, said inner receptacle bottom and said false bottom having registering openings, and a valve within said registering openings adapted to supply air from the air space to the water within the inner container.

References Cited in the file of this patent

UNITED STATES PATENTS

| | | |
|---|---|---|
| 649,800 | Bollard | May 15, 1900 |
| 763,437 | Sobey | June 28, 1904 |
| 958,857 | Dennis | May 24, 1910 |
| 1,604,971 | Churchill et al. | Nov. 2, 1926 |
| 2,020,536 | Cox | Nov. 12, 1935 |